L. WEAVER & T. DECKER.
Machine for Making Twist-Drills.

No. 164,115.  Patented June 8, 1875.

Witnesses  
D. R. Cowl  
Edmund Masson

Inventors,  
Loyd Weaver.  
Theodore Decker.  
By Atty.  
A. B. Stoughton.

UNITED STATES PATENT OFFICE.

LOYD WEAVER AND THEODORE DECKER, OF SEYMOUR, CONNECTICUT.

IMPROVEMENT IN MACHINES FOR MAKING TWIST-DRILLS.

Specification forming part of Letters Patent No. 164,115, dated June 8, 1875; application filed February 23, 1875.

*To all whom it may concern:*

Be it known that we, LOYD WEAVER, a subject of the Queen of Great Britain, and THEODORE DECKER, a citizen of the United States, both residing at Seymour, in the county of New Haven and State of Connecticut, have invented certain new and useful Improvements in Apparatus for Making Twist-Drills; and we do hereby declare the following to be a full, clear, and exact description of the same, reference being had to the accompanying drawings, making a part of this specification, in which—

Figure 1:
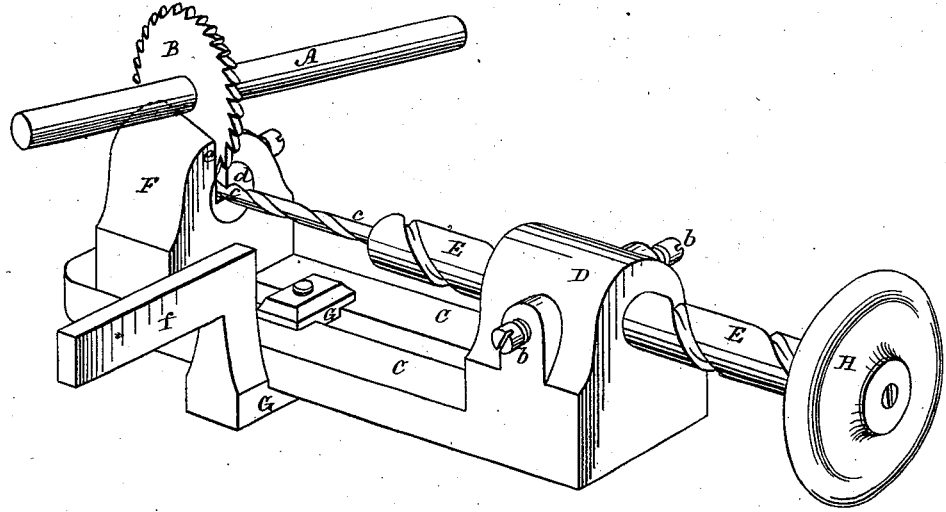
Figure 2:
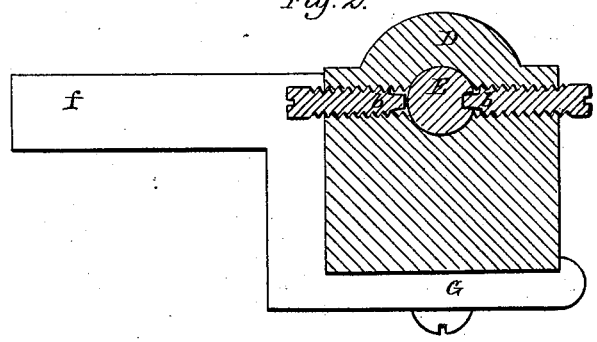
Figure 3:
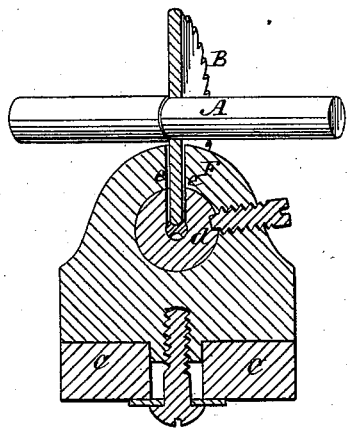

Figure 1 represents the apparatus in perspective. Fig. 2 represents a section through the arbor and guide-piece. Fig. 3 represents a section through the head and bushing.

Our invention relates to an apparatus which may be used, in connection with a common machinist's lathe, for cutting the grooves or spirals in twist-drills; and our invention consists, first, in the combination of the nut or guide-piece, the feeding-mandrel, and the diametric screws or screw-points, so as to cut the two spiral grooves by simply moving one or the other of the screw-points into, and the opposite one out of, action.

Our invention further consists in the combination of the oblique slot with the interchangeable bushing in the head-piece, to allow the milling or cutting tool to reach the blank, and to adapt the machine or apparatus for making drills of different sizes.

Our invention further consists in a bracket or arm adjustably connected to the bed-piece of the apparatus, for attaching said apparatus to the tool-rest of, and operating it in connection with, an ordinary machinist's lathe.

To enable others skilled in the art to make and use our invention, we will proceed to describe the same with reference to the drawings.

The shaft A, which carries the milling or cutting tool B, may be attached to or set in the heads or spindles of a common lathe, and so rotated. On one end of the bed-piece C is affixed a nut or guide-piece, D, through which the feeding-mandrel E passes. In this mandrel is cut a spiral groove of the form and pitch which it is desired to give to the twist-drill grooves; and in the nut or guide-piece D are arranged, on opposite sides or portions thereof, two screws, $b$ $b$, the points of which may be run down, so that the groove of the feeding-mandrel shall take in one or the other of the points of said screws, as the case may be, so as to turn said mandrel and the drill-blank $c$, which it carries and feeds up under and past the milling or cutting tool B. Upon the opposite end of the bed-piece C there is an adjustable head, F, in which is placed a removable bush, $d$. Through this bush longitudinally is made an opening, into and through which the drill-blank that is being operated upon or grooved can snugly pass, and at the same time rest upon under the action of the milling-tool B. This hole or opening through the bush is in the same plane as that of the blank $c$, or of the mandrel that feeds it along and rotates it at the same time, and should be of a diameter corresponding to that of the drill-blank. From the top of the head F an oblique slot, $e$, is cut down as low as the bush, and as low as the opening through the bush, so that the milling or grooving tool can cut the grooves in the drill or drill-blank of the proper depth, and the obliquity of this slot $e$ is such that it becomes tangential, or nearly so, to diametric portions of the hole through the bush, at opposite ends of said bush. In the slot in the bed-piece C, in and through which the head F can be moved and adjusted, there is also placed a slide, G, having a bracket or arm, $f$, upon it, which bracket or arm is made to fit into an ordinary lathe-tool rest, and be fastened therein, and by this means the apparatus may be connected to and worked in connection with an ordinary lathe, and adjusted thereto, as may be desired.

The feeding-mandrel E may be turned readily by hand through the knob H.

But one of the screws or screw-points $b$ are used at one time. When one groove has been cut in the drill-blank, and a second one required, it is only necessary to run back the screw that has been used for guiding the cutting of the first spiral groove, and run up the one that was inactive. These screws, being on diametrically-opposite sides of the feeding-mandrel, bring the second groove in the exact and proper place on the blank, as they exactly reverse or change the feed of the mandrel, and so cut the second groove exactly midway of the spiral land between the turns of the first one.

By changing the feeding-mandrel and the bush, twist-drills of various sizes and of varying pitch of grooves may be made.

Instead of the screws $b\ b$, which require a driver to run them up and back, steel points may be used, that are moved in or out, and so held, by a cam movement that would be more expeditious, and they could be held in or out by the same cams. Other mechanisms would accomplish the same end; and we do not confine ourselves to shifting screws alone for the shifting action of the groove of the feeding-mandrel.

Having thus fully described our invention, what we claim is—

1. The combination of the nut or guide-piece D, the feeding-mandrel E, with single spiral groove, and the two screws $b\ b$, or their mechanical equivalents, for feeding up the blank and for gaging and spacing the grooves therein, substantially as described and represented.

2. The combination of the adjustable head F, the changeable bushing $d$, oblique slot $e$, and milling or cutting tool B, as and for the purpose described and represented.

LOYD WEAVER.
THEODORE DECKER.

Witnesses:
AULOR FRENCH,
S. C. TUCKER.